UNITED STATES PATENT OFFICE.

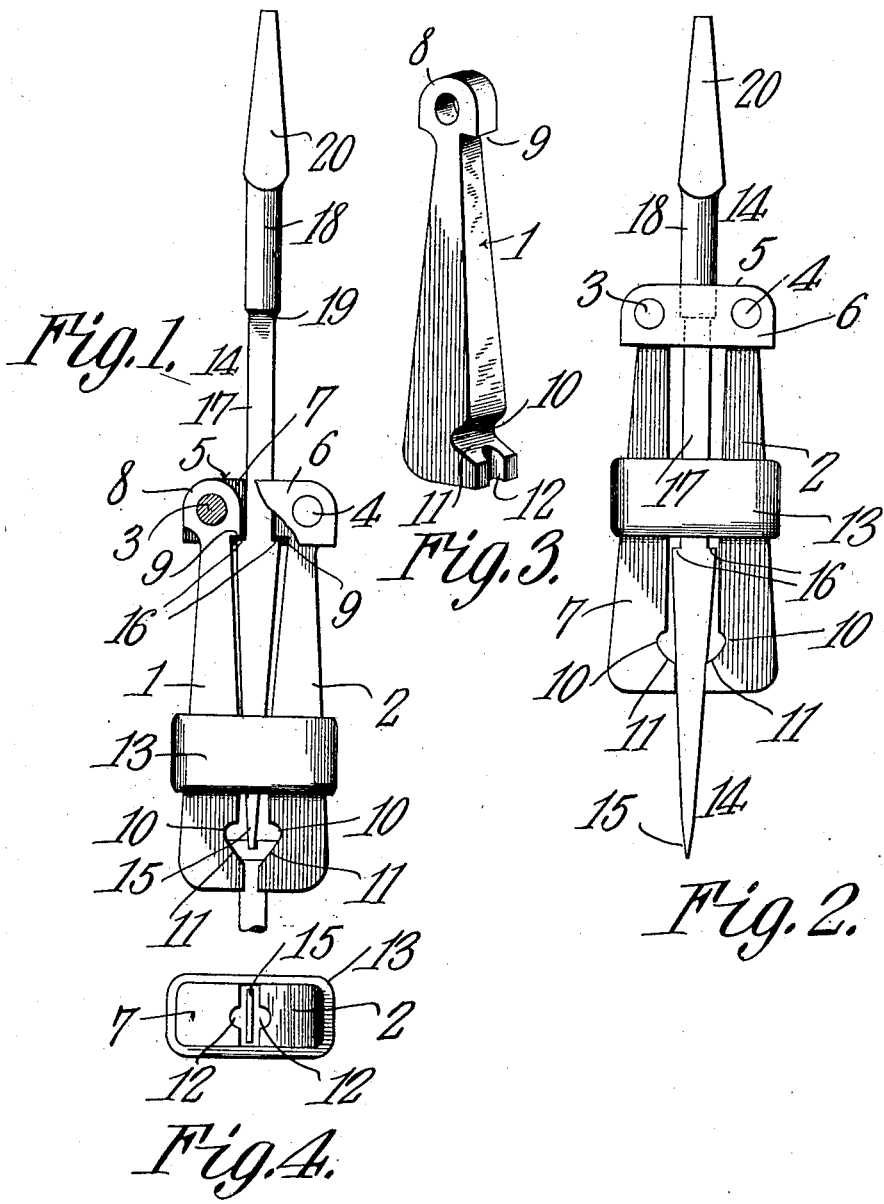

WILLIAM KIRK COZAD, OF WORTHINGTON, PENNSYLVANIA.

SCREW-DRIVER.

No. 892,367.  Specification of Letters Patent.  Patented June 30, 1908.

Application filed April 15, 1907. Serial No. 368,288.

*To all whom it may concern:*

Be it known that I, WILLIAM KIRK COZAD, a citizen of the United States, residing at Worthington, in the county of Armstrong and State of Pennsylvania, have invented a new and useful Screw-Driver, of which the following is a specification.

This invention relates to a novel type of screw drivers, the object of which is to apply to a screw driver means for grasping a screw at the head and holding it firmly in line with the body of the screw driver against independent rotation when the screw driver is turned to drive the screw home. By the use of this invention it is not necessary to bore a hole where a screw is to be placed, all that is required is to put a screw in position in the screw driver, clamp it firmly and then place the point of the screw on the proper spot, press on and rotate the screw driver.

Other objects of the invention not above recited will be fully described hereafter, illustrated in the drawing, and pointed out in the claims.

Similar numerals of reference indicate the same parts in all the figures.

The numerals 1 and 2 indicate two jaws, mounted on pivot pins 3 and 4 fixed in a head 5 composed of two plates 6 and 7 between which plates the jaws are adapted to swing to a limited extent toward and from each other. The heads 8 of the jaws through which the pivot pins 3 and 4 pass are each provided on its inner side with a shoulder 9, just below its pivot, and facing downwardly. Near the lower end of each jaw, which is wider than at the shoulder 9 because of its tapering formation, is a curved undercut 10 of short radius terminating in a downwardly inclined tangential surface 11, the angle of which is the same as that of a flat headed wood screw and terminating at the inner side of the jaw just above its lower end. From the bottom of each jaw to the inclined surface 11 is a groove or depression 12 in which the body of a screw is placed to be clamped, its head resting on the inclined surfaces 11.

Surrounding the jaws 1 and 2 is an approximately rectangular ring or band 13, movable vertically on the jaws, but, because of the tapering outer edges of said jaws, the band or ring serves as a means for causing the lower ends of the jaws to clamp tightly whatever may be placed between them.

Between the jaws 1 and 2 and the tool head 5 is a longitudinally movable screw driver 14, free to travel endwise in either direction for a limited distance. The lower end 15 of the screw driver is brought to a dull edge as usual and then gradually increases in width towards the opposite end for a suitable distance where there is a sudden lessening in width to form shoulders 16. The body 17 then continues for a certain distance at the same reduced width and then enlarges at 18 forming shoulders 19. The upper end 20 of the screw driver is made of the usual form to fit in a bit stock or handle for rotating the screw driver.

The distance between the operative end 15 or bit of the screw driver and the shoulders 16 is such that when the screw driver is drawn in between the jaws 1 and 2 until the shoulders 16 thereon strike the shoulders 9 on the jaws the end 15 will be in position to take into the slot in the screw head, (see Fig. 1). When the screw driver is to be used independently of the jaws, it is pushed from between them until the shoulders 19 thereon strike the heads 8 of the jaws, as represented in Fig. 2. In either position they are clamped by moving the ring or band downwardly.

The screw driver is operated by sliding the ring or band 13 towards the head 5 so that the jaws 1 and 2 may open. The screw driver is also to be drawn rearwardly. A screw is then placed between the jaws in the notches 12, its head resting on the inclined surfaces 11 and the bit of the screw driver inserted in the notch in the screw head. The ring or band is then moved downwardly until the jaws firmly clamp the screw and screw driver. The screw may now be driven in any desired place and at any angle without first forming a hole, as it is rigidly held between the jaws, and the bit of the screw driver rests in the slot in the screw head. As soon as the screw has been driven in about one half or two thirds of its length, or, until the jaws approach the substance into which the screw entered, the ring or band is drawn back, the screw driver pushed from between the jaws and the ring or band moved once more to close the jaws on the screw driver which is now in position to force the screw home.

A careful inspection of the structure shown will disclose the fact that when the band 13 is positioned against the plates 6 and 7 it will operate to limit the outward swinging movement of the jaws 1 and 2. As a result the shoulders 9 upon said jaws are always positioned in the paths of the shoulders 16 carried by the screw driver 14. It will be apparent therefore that should the tool be in a horizontal or in an inverted position where the band 13 would not slide by gravity upon the jaws and toward their recesses 10, a pull upon the screw driver longitudinally will cause the shoulders 16 to press against shoulders 9 and thus positively swing jaws 1 and 2 toward each other and into engagement with a screw inserted between them. It can thus be held until the band 13 is slid into clamping position. This arrangement of parts is particularly useful where a screw is to be removed from a point overhead because, by placing one of the jaws against the side of the screw and pulling longitudinally on the screw driver the other jaw will be directed against the screw and the two jaws thus held in position by the weight of the screw driver 14 until the band can be slid into locking position.

Having thus described the invention what is claimed is:—

1. A tool comprising spaced plates constituting a head, oppositely disposed similar jaws pivotally mounted at one end between the end portions of the plates, said jaws having inwardly extending shoulders adjacent their pivots and between the plates, said plates extending beyond the outer faces of the jaws, a non-flexible band slidably mounted upon and surrounding the jaws for limiting their spreading movement, said projecting portions of the plates constituting stops for the band, and a screw driver having a shank slidably mounted between the plates and the pivot portions of the jaws, there being shoulders upon the shank for engaging the shoulders on the jaws to shift said jaws toward each other.

2. A tool comprising spaced plates constituting a head, oppositely disposed similar jaws pivotally mounted between the plates, each of said jaws being tapered toward its pivot, the free ends of said jaws having their inner or adjoining faces recessed for the reception of a screw head and shank, there being inwardly extending shoulders integral with the jaws adjacent the pivots thereof and between the head plates, a screw driver tapered reversely to the jaws and movably mounted therebetween, said tapered portion terminating in oppositely extending shoulders, a shank extending from the shouldered end of the screw driver and between the head plates and the pivots of the jaws, said shoulders of the screw driver being disposed to bear against the shoulders of the jaws to swing the jaws into clamping position, and a non-flexible band extending around and disposed to slide in the direction of the length of the jaws, the terminals of the head plates and the large ends of the jaws constituting means for limiting the sliding movement of the band.

In testimony that I claim the foregoing as my own, I have hereto affixed my signature in the presence of two witnesses.

WILLIAM KIRK COZAD

Witnesses:
W. W. BARNHART,
J. B. HINDMAN.